US012493050B2

(12) United States Patent
Lahdesmaki

(10) Patent No.: US 12,493,050 B2
(45) Date of Patent: Dec. 9, 2025

(54) SEQUENTIAL INJECTION ANALYSIS SYSTEM AND METHOD FOR MIXING FLUIDS

(71) Applicant: FIAlab Insruments Inc., Seattle, WA (US)

(72) Inventor: Ilkka Lahdesmaki, Seattle, WA (US)

(73) Assignee: FIALAB INSTRUMENTS, INC., Seattle, WA (US)

( * ) Notice: Subject to any disclaimer, the term of this patent is extended or adjusted under 35 U.S.C. 154(b) by 313 days.

(21) Appl. No.: 18/130,568

(22) Filed: Apr. 4, 2023

(65) Prior Publication Data

US 2024/0337674 A1 Oct. 10, 2024

(51) Int. Cl.

| | |
|---|---|
| ***G01N 1/38*** | (2006.01) |
| ***G01N 1/14*** | (2006.01) |
| ***G01N 35/04*** | (2006.01) |
| ***G01N 35/08*** | (2006.01) |
| *G01N 35/00* | (2006.01) |

(52) U.S. Cl.

CPC ............... *G01N 35/08* (2013.01); *G01N 1/14* (2013.01); *G01N 35/04* (2013.01); *G01N 2035/00346* (2013.01); *G01N 2035/00534* (2013.01); *G01N 2035/0403* (2013.01); *G01N 2035/0406* (2013.01)

(58) Field of Classification Search

CPC .......... G01N 35/08; G01N 1/14; G01N 35/04; G01N 2035/00346; G01N 2035/00534; G01N 2035/0403; G01N 2035/0406; G01N 1/38; G01N 2035/00544; G01N 35/1002; G01N 2001/1418; G01N 2001/1427

USPC ........... 73/1.02, 61.43, 61.59, 64.56, 863.01, 73/863.33, 863.84, 864.35, 864.81; 436/180; 422/68.1, 81; 366/140, 144, 366/145, 146, 191

See application file for complete search history.

(56) References Cited

U.S. PATENT DOCUMENTS

2014/0112829 A1* 4/2014 Thomas ............... G01N 35/026 422/562

FOREIGN PATENT DOCUMENTS

| | | | |
|---|---|---|---|
| AU | 9700298 A * | 3/1999 | |
| CN | 110038651 A * | 7/2019 | .............. B01L 3/502 |
| WO | WO-2017223195 A1 * | 12/2017 | ................ B01L 3/00 |

* cited by examiner

*Primary Examiner* — Robert R Raevis
(74) *Attorney, Agent, or Firm* — Alloy Patent Law; Walker Griffin Weitzel

(57) ABSTRACT

The present disclosure relates to a sequential injection analysis system and method for mixing fluids. The sequential injection analysis system includes a fluid pumping device configured for aspirating and dispensing fluids, at least one multi-position stream selection device and a conical vial enclosure. The conical vial enclosure includes a vial top cap, a vial bottom cap and a vial block positioned between the vial top cap and the vial bottom cap. The vial block includes vial holes wherein each vial hole is configured to receive an enclosed conical vial. The present invention provides homogeneous mixing of fluid samples with liquid reagent solutions.

20 Claims, 7 Drawing Sheets

SEQUENTIAL INJECTION ANALYSIS SYSTEM AND METHOD FOR MIXING FLUIDS

TECHNICAL FIELD

The present invention relates to automated physical and chemical manipulation of a fluid sample, for the purpose of analytical chemistry measurements, and more particularly, the present invention relates to apparatus and method for the use of sequential injection analysis (SIA) system for the homogeneous mixing of fluid samples with liquid reagent solutions.

BACKGROUND

When fluid samples are analyzed by means of optical spectrometry, liquid chromatography, or mass spectrometry, it is often necessary to subject the sample to chemical and physical pretreatment. Pretreatment is required for purposes such as removing interfering substances in the sample matrix, rendering the sample in a more dilute, or more concentrated form, or altering the physical, chemical, or optical properties of the sample to facilitate its analysis. These operations are carried out by mechanisms like solvent addition, solid phase extraction followed by elution, or reactive treatment of the sample via chemical derivatization. For derivatization reactions, controlled temperature conditions are often desired for reaction speed and reproducibility.

Generally, when fluid sample analysis is performed in a laboratory setting, such pretreatment is usually carried out manually by an analyst, or in an automated manner by pipetting robots. For process monitoring measurements, neither approach is satisfactory as samples are exposed to the ambient atmosphere, and transfer to the spectrometry or chromatography device requires operator intervention. An enclosed pretreatment method capable of transferring the treated sample to a spectrometer/chromatograph is required, as otherwise, the process monitoring activities cannot be fully automated. Several devices exist in the prior art for simple automated pretreatment operations, but those are usually restricted to the very elemental unit operations of sample transfer and dilution. Examples of automated dilution devices are described in US20160077060A1 titled "Process sample and dilution systems and methods of using the same".

A more advanced fluid manipulation technology called sequential injection analysis (SIA) has been developed and documented in various academic research papers, for instance, in Lenehan et al. "Sequential injection analysis" Analyst 2002, 127, 997-1020. The sequential injection technology allows very flexible sample treatment by mixing the sample with other fluids, as well as subjecting the mixture to in-line heating, solid-phase extraction, gas diffusion, dialysis, etc. Thus, it provides an automated, enclosed platform that surpasses the capabilities of the simple dilution & transfer devices mentioned above.

From a mechanical perspective, sequential injection is based on a bi-directional syringe/piston/plunger pump for propelling fluid movement, and a selector valve for directing the device to the correct fluid source or destination for each step of the pretreatment routine. The pump is used to pull sample and reagent segments through the selector valve ports, into a coil of capillary tubing located between the pump and the valve. Mixing typically occurs in the tubing coil, as the aspirated fluid segments are moved back and forth by the pump. Such devices have been manufactured commercially and certain specific configurations and applications have been patented as shown in U.S. Pat. No. 5,721,135A titled "apparatus for identifying biologically active substances by their effect on living cells", U.S. Pat. No. 5,695,720 A titled "flow analysis network apparatus", U.S. Pat. No. 6,887,429 B1 titled "apparatus and method for automated medical diagnostic tests", and US20050244299A1 titled "automated sequential injection analysis systems for the determination of trace endotoxin levels".

As described above, the basic premise of sequential injection is mixing fluid segments inside narrow-bore capillary tubing. This allows easy mixing of small fluid volumes but suffers from the downside that homogeneous mixing is nearly impossible due to the restrictive geometry of the narrow-bore channel. For the same reason, mixing more than three fluid components together is challenging, as the first and the last components introduced into the capillary tube will hardly come in contact with one another. At times, mixing chambers with stir bars have been used to achieve the complete mixing of multiple components as shown in U.S. Pat. No. 6,887,429 B1. However, mixing chambers tend to be problematic since it takes a large volume of solution to clear the chamber of its previous contents before the next sample processing cycle can begin.

A variant of the traditional sequential injection setup has been utilized for liquid-liquid extraction where a mechanical syringe on a syringe pump is used as a mixing chamber (suarez et al., titled "In-syringe magnetic stirring-assisted disperse microextraction for automation and downscaling of methylene blue active substances assay" Talanta, 2014, vol. 130, p. 555-560; maya et al., titled "Lab in a syringe: Fully automated dispersive liquid-liquid microextraction with integrated spectrophotometric detection" Anal bioanal chem, 2012, vol. 404, p. 909-917). A stir bar or magnetic beads inside the syringe are used to achieve proper mixing. Such a system offers the advantage that the syringe piston can be compressed to squeeze out the syringe contents, which clears the mixing compartment much more efficiently compared to a traditional stirred tank chamber. The inclusion of a mechanical stirring component inside the syringe is useful for liquid-liquid extraction where vigorous mixing is required. However, it limits the degree to which the contents can be expelled and introduces mechanical complexity to the apparatus.

The above restriction can be removed by omitting the mechanical stirring component and relying on the syringe motion to mix the contents of the syringe (deng et al., titled "automated determination of dissolved reactive phosphorus at nanomolar to micromolar levels in natural waters using a portable flow analyzer" Anal. Chem., 2020, vol. 92, p. 4379-4386). The approach works but falls short in cases where the components to be mixed have different viscosities and densities (many syringe reversals are required for complete mixing). It also falls short when small amounts of liquids need to be mixed (any syringe has a fixed internal volume at the tip that sets a limit to how small of a volume can be handled).

The existing prior art solutions related to fluid manipulation are ineffective and/or inefficient as the prior art solutions fail to provide homogeneous mixing, are complex in nature, and are not a feasible solution for mixing a variety of fluids. There is a need for an effective and efficient system as well as a method that solves the aforementioned problems of existing prior art solutions related to fluid manipulation.

Thus, a new and improved sequential injection analysis system is proposed that solves the aforementioned problems of fluid mixing of existing prior art solutions.

SUMMARY

While the way that the present disclosure addresses the disadvantages of the prior art will be discussed in greater detail below, in general, the present disclosure provides a new and improved sequential injection apparatus.

The present disclosure overcomes the drawbacks of the existing devices by providing a sequential injection sample analysis system that utilizes enclosed conical vials as mixing chambers. The sequential injection sample analysis system achieves complete homogeneous mixing with less effort compared to a traditional sequential injection apparatus, or in-syringe mixing. The conical bottom of the enclosed conical vial promotes turbulence as the liquid components are dispensed into the enclosed conical vial. The conical bottom design of the enclosed conical vial also allows the sequential injection sample analysis system to mix both small and large liquid volumes, by creating a space where small volumes can be contained and manipulated much more easily than in a flat-bottom container. The sequential injection sample analysis system houses the enclosed conical vial in a vial block that allows the attachment of a temperature control element for heating (to promote chemical reactions) or cooling (to prevent degradation) of the liquids.

The vial block is equipped with a vial top cap at the top and the vial bottom cap at the bottom. The vial top cap comprises vial top cap ports that are internally threaded, allowing the enclosed conical vial to be connected to a fluidic setup of pumps and valves, using capillary tubing, thus creating a fully enclosed setup. The tubing is pushed to the bottom of the enclosed conical vial, thus allowing the enclosed conical vial to be not only filled but also emptied by automated pump action.

The vial bottom cap further comprises a plurality of vial bottom cap ports that are internally threaded, so that the enclosed conical vial can be accessed from both ends that is the top end and the bottom end. Bottom access is especially important when the ability to quickly wash an enclosed conical vial is of high importance. In such a scenario, one syringe pump could fill the enclosed conical vial with wash liquid while another syringe pump could drain the liquid from the enclosed conical vial. Bottom access can also be of use when the operations following the mixing step are not chemically compatible with the steps leading up to the mixing step. In such a scenario, the syringe pump accessing the top port of the enclosed conical vial could contain chemicals of "nature A" while the pump accessing the bottom port of the enclosed conical vial could contain chemicals of "nature B". When a bottom access port is used, the bottom of the enclosed conical vial should be modified by drilling a hole through the enclosed conical vial.

Embodiments of the present invention discloses a sequential injection sample analysis system comprises a fluid pumping device configured for aspirating and dispensing fluids; a multi-position stream selection device in fluid communication with the fluid pumping device, wherein the multi-position stream selection device comprises a plurality of ports, and each of the port is in in fluid communication with a fluid line; wherein the fluid line comprises a sample line in fluid communication with a port of the multi-position stream selection device, wherein the sample line carries/transports a sample; wherein the fluid line further comprises a reagent line in fluid communication with a port of the multi-position stream selection device, wherein the reagent line carries/transports a reagent that is capable of reacting with a component of the sample coming from sample line to form a reaction product; a conical vial enclosure comprising a vial top cap that includes a vial top cap port fluidly connected to a port of the multi-position stream selection device, a vial block positioned below the vial top cap, wherein the vial block comprises a plurality of vial holes wherein each vial is configured to receive an enclosed conical vial; wherein the enclosed conical vial is in fluid communication with the vial top cap port; wherein the enclosed conical vial is configured to facilitate mixing of the two or more fluids within the enclosed conical vial. The two or more fluids to be mixed comprises a sample coming from the sample line and a reagent coming from the reagent line within the enclosed conical vial.

In an embodiment, a detector is in fluid communication with the multi-position stream-selection device, for generating a signal indicative of some parameter/property of the mixed fluid and thus, the detector is capable of performing a fluid mixture test.

In an embodiment, a controller is operatively connected to the multi-position stream-selection device and the fluid pumping device, and the controller is constructed and arranged for automatic control of fluid flow between the multi-position stream-selection device, the fluid pumping device, the sample line, and the reagent line.

In an embodiment, a pair of holding coils is in a fluid connection between the fluid pumping device and the multi-position stream-selection device; wherein the pair of holding coils includes interior passageways forming a portion of the fluid path in the sequential injection sample analysis system.

In an embodiment, the vial block comprises a temperature control unit to control the temperature in the vial block, wherein the temperature control unit comprises a heating element configured to provide heat to the enclosed conical vial and a temperature sensing unit configured to detect the temperature of the enclosed conical vial.

In an embodiment, the vial block comprises a viewing window to allow analysts to visually observe the fluid contents in the enclosed conical vial.

Embodiments of the present invention further discloses a sequential injection sample analysis system comprising:—a first fluid pumping device configured for aspirating and dispensing fluids; a second fluid pumping device configured for aspirating and dispensing fluids; a first multi-position stream selection device in fluid communication with the first fluid pumping device, wherein the first multi-position stream selection device comprises a plurality of ports, and each of the port is in in fluid communication with a fluid line; a second multi-position stream selection device in fluid communication with the second fluid pumping device, wherein the first multi-position stream selection device comprises a plurality of ports, and each of the port is in in fluid communication with a fluid line; wherein the fluid line comprises a sample line in fluid communication with a port of the at least one of the first multi-position stream selection device and the second multi-position stream selection device, wherein the sample line carries/transports a sample; wherein the fluid line further comprises a reagent line in fluid communication with a port of the at least one of the first multi-position stream selection device and the second multi-position stream selection device, wherein the reagent line carries/transports a reagent that is capable of reacting with a component of the sample coming from sample line to form a reaction product; a conical vial enclosure comprising a vial top cap that includes a vial top cap port fluidly connected to a port of the first multi-position stream selection device, a vial bottom cap that includes a plurality of vial bottom cap ports fluidly connected to a port of the second multi-position stream selection device, and a vial block that is positioned between the vial top cap and the vial bottom cap; wherein the vial block comprises a plurality of vial holes wherein each vial hole is configured to receive an enclosed conical vial; wherein the enclosed conical vial is in fluid communication with the vial top cap port and the vial bottom cap port, wherein the enclosed conical vial is configured to facilitate mixing of the two or more fluids within the enclosed conical vial. The two or more fluids to be mixed comprises a sample coming from the sample line and a reagent coming from the reagent line within the enclosed conical vial.

In an embodiment, a solvent line is in fluid communication with at least one of the first multi-position stream selection device and the second multi-position stream selection device, for dissolving or diluting the reagent coming from the reagent line.

In an embodiment, the first fluid pumping device and the second fluid pumping device are bi-directional syringe pumps.

In an embodiment, a detector is in fluid communication with the at least one of the first multi-position stream selection device and the second multi-position stream selection device, for generating a signal indicative of some parameter/property of the mixed fluid and thus, the detector is capable of performing a fluid mixture test.

In an embodiment, a controller is operatively connected to the first multi-position stream selection device, the second multi-position stream selection device, the first fluid pumping device and the second fluid pumping device, and constructed and arranged for automatic control of fluid flow between the first multi-position stream selection device, the second multi-position stream selection device, the first fluid pumping device, the second fluid pumping device, the sample line, and the reagent line.

In an embodiment, a pair of holding coils is in a fluid connection between the first fluid pumping device and the first multi-position stream-selection device; wherein the pair of holding coils includes interior passageways forming a portion of the fluid path in the sequential injection sample analysis system; and a third holding coil is in fluid connection between the second fluid pumping device and the second multi-position stream-selection device; wherein the third holding coil includes interior passageways forming a portion of the fluid path in the sequential injection sample analysis system.

In an embodiment, a mixing tee connector is arranged in a fluid line.

In an embodiment, a first sealing ring is positioned between the enclosed conical vial and the vial top cap; and a second sealing ring is positioned between the enclosed conical vial and the vial bottom cap.

In an embodiment, the vial block comprises a temperature control unit to control the temperature in the vial block, wherein the temperature control unit comprises a heating element configured to provide heat to the enclosed conical vial and a temperature sensing unit configured to detect the temperature of the enclosed conical vial.

In an embodiment, the vial block comprises a viewing window to allow analysts to visually analyze the fluid contents in the enclosed conical vial.

BRIEF DESCRIPTION OF THE DRAWINGS

A more complete understanding of the present disclosure may be derived by referring to the detailed description and claims when considered in connection with the figures, wherein like reference numerals refer to similar elements throughout the figures.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the present invention.

Figure 1:
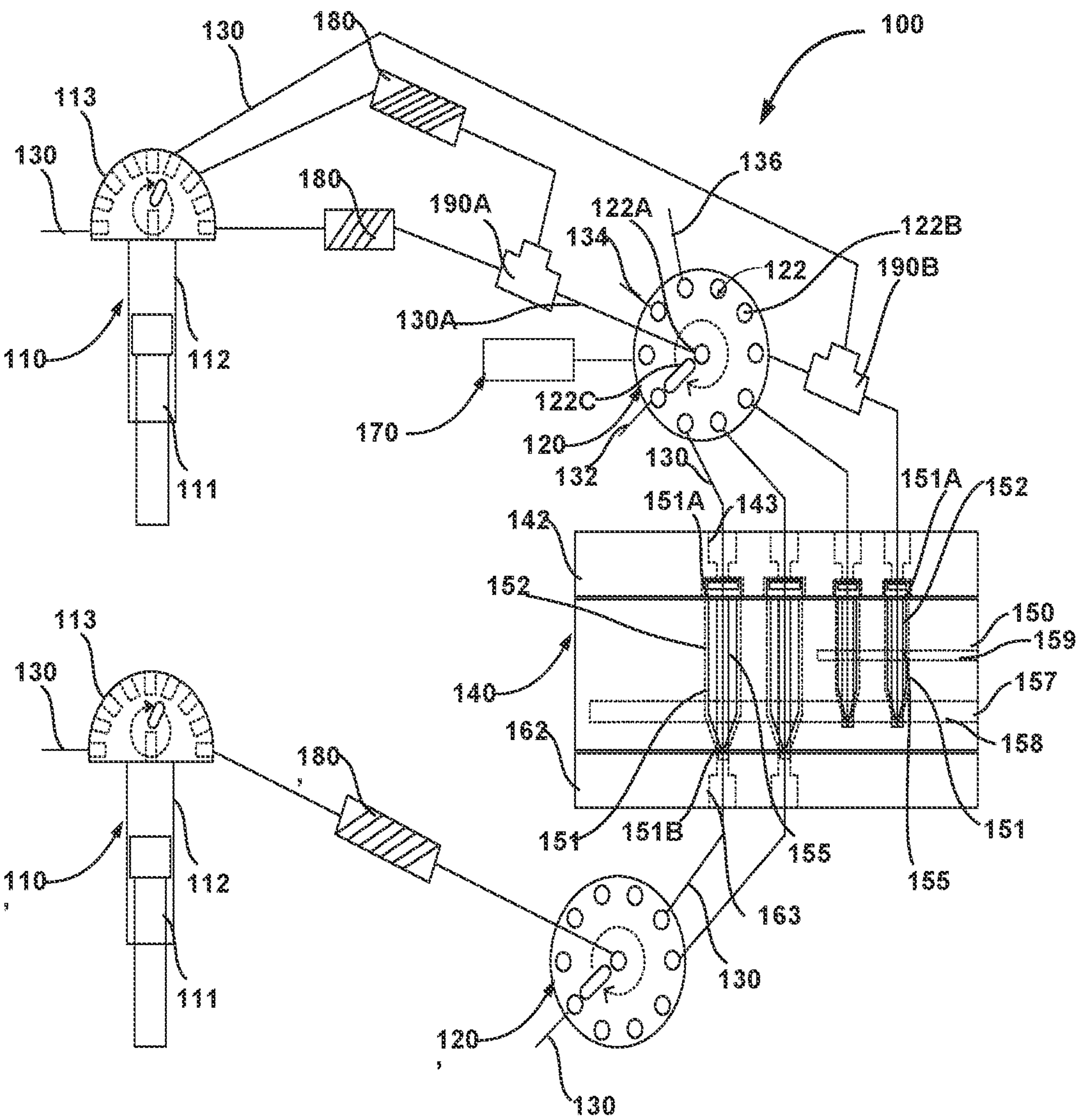
FIG. 1 is a schematic view of a sequential injection sample analysis system in accordance with an embodiment of the present invention.

Referring now to FIG. 1, the present invention is related to a sequential injection sample analysis system 100, according to a first embodiment of the present invention. The sequential injection sample analysis system 100 is configured for efficient filling of a plurality of enclosed conical vials 152, homogeneous mixing of fluids of a plurality of enclosed conical vials 152 in an enclosed environment, and emptying the fluid contents of the plurality of enclosed conical vials 152 and washing of the plurality of enclosed conical vials 152. The sequential injection sample analysis system 100 comprises a first fluid pumping device 110, a second fluid pumping device 110', a first multi-position stream selection device 120 in fluid communication with a plurality of fluid lines 130, a second multi-position stream selection device 120' in fluid communication with a plurality of fluid lines 130, a conical vial enclosure 140, a controller (not shown in figures) and at least one detector 170, the entirety of which will be described in greater detail in below description. A plurality of fluid lines 130 are configured to transport a plurality of fluids through the sequential injection sample analysis system 100. One or more fluid lines 130 are operably connected to the first fluid pumping device 110, the second fluid pumping device 110', the first multi-position stream selection device 120, the first multi-position stream selection device 120, the conical vial enclosure 140 and a detector 170.

The first fluid pumping device 110 and the second fluid pumping device 110' are similar in design and thus, the first fluid pumping device 110 will only be described for sake of simplicity. The first fluid pumping device 110 is configured for aspirating fluids as well as dispensing various fluids using the first fluid pumping device 110. In an embodiment, the first fluid pumping device 110 is a bi-directional multi-channel syringe pump 110 known in the prior art and sold by various merchandises under various product names such as but not limited to Tecan Cavro Syringe pump. The syringe pump 110 includes a reciprocating piston 111 positioned within a syringe housing 112 as shown in FIG. 1. The reciprocating piston 111 is driven by an electric motor (not shown in figures) such as but not limited to: stepper motor and so on. The electric motor (not shown in figures) is electrically controlled by the controller (not shown in figures). The syringe pump 110 includes a plurality of channel ports 113. A group of the channel ports 113 selected from the plurality of channel ports 113 of the syringe pump 110 are configured to be connected to a plurality of fluid sources through a plurality of fluid lines 130 wherein the fluid of the plurality of fluid sources are individually referred as liquid A, liquid B, liquid C and so on. The remaining group of the channel ports 113 selected from the plurality of channel ports 113 of the syringe pump 110 are configured to be connected to plurality of fluid lines 130 of the sequential injection sample analysis system 100.

In an embodiment (not shown in figures), the syringe pump 110 includes an integrated electric rotary valve (not shown in figures) electrically controlled by the controller (not shown in figures) wherein the integrated electric rotary valve (not shown in figures) is configured to fluidly connect a channel port 113 selected from the plurality of channel ports 113 to any other channel port 113 selected from the plurality of channel ports 113.

The first multi-position stream selection device 120 is in fluid communication with the first fluid pumping device 110, wherein the first multi-position stream selection device 120 comprises a plurality of ports 122, and each of the ports 122 is in fluid communication with a fluid line 130. The second multi-position stream selection device 120' is in fluid communication with the second fluid pumping device 110'. The second multi-position stream selection device 120' comprises a plurality of ports 122, and each of the port 122 is in fluid communication with a fluid line 130.

The first multi-position stream selection device 120 and the second multi-position stream selection device 120' are similar in design and thus, the first multi-position stream selection device 120 will only be described for sake of simplicity. The first multi-position stream selection device 120 is a multi-position selection valve 120 known in the prior art and sold by various merchandises under various product names such as but not limited to: Valco selector multi-position valves. In alternate embodiments, other stream selection devices other than a multi-position selection valve could be used. The plurality of ports 122 are further designated/categorized as a single central port 122A and a plurality of outer ports 122B that are arranged in a circle around the central port 122A such that the plurality of ports 122 includes a single central port 122A and a plurality of outer ports 122B. The plurality of fluid lines 130 comprises a primary fluid line 130A that is in fluid communication with the central port 122A. The primary fluid line 130A is configured to fluidly connect the first multi-position stream selection device 120 with at least one of the holding coils 180. The multi-position selection valve 120 comprises a rotational switch 122C that can be rotated to select one of the surrounding outer ports 122B. In this way, fluids can be accessed from one of the surrounding outer ports 122B via the central port 122A or pumped from the central port 122A to one of the surrounding outer ports 122B. In FIG. 1, some of the outer ports 122B are shown with flow lines 130 coupled to them and some of the outer ports 122B are shown empty.

In another embodiment (not shown in figures), the primary fluid line 130A is in fluid communication with the outer port 122B selected from one of the surrounding outer ports 122B.

In an embodiment, the plurality of fluid lines 130 comprises a sample line 132 that is in fluid communication with an outer port 122B of the at least one of the first multi-position stream selection device 120 and the second multi-position stream selection device 120', wherein the sample line 132 carries/transports a sample wherein the sample could be fed from a sample source (not shown in figures). The plurality of fluid lines 130 further comprises a reagent line 134 that is in fluid communication with an outer port 122B of the at least one of the first multi-position stream selection device 120 and the second multi-position stream selection device 120', wherein the reagent line 134/transports a reagent wherein the reagent could be fed from a reagent source (not shown in figures). The reagent is capable of reacting with a component of the sample coming from sample line 132 to form a reaction product. The plurality of fluid lines 130 further comprises a solvent line 136 that is in fluid communication with the at least one of the first multi-position stream selection device 120 and the second multi-position stream selection device 120', for dissolving or diluting the reagent coming from reagent line 134. It should be understood that each of the fluid line 130 is not shown in figures for ease of understanding and avoiding repetition/duplicity in figures, and only some fluid line 130 are shown in figures.

In another embodiment (not shown in figures), the plurality of fluid lines 130 includes a plurality of sample lines 132, a plurality of reagent lines 134, and a plurality of solvent lines 136. This configuration allows for multiple fluid mixture tests related to some parameter/property of fluid mixture to be conducted simultaneously.

It should be understood that the term "plurality of fluid lines" designated as 130 includes any number of flow paths that carry/transport any fluid inside/outside/within the sequential injection sample analysis system 100. In other words, the plurality of fluid lines 130 includes a plurality of flow paths carrying/transporting fluids such as samples, reagents, washing liquids, elution buffers, solvents, and so on. Further, the plurality of fluid lines 130 could include fluid mixtures of at least any two of the above-mentioned fluids and/or combinations and so on. Further, the plurality of fluid lines 130 includes waste carrying/transporting fluid paths/ports and so on. Further, it should be understood that the term "fluid mixture" includes at least two fluids wherein the fluids could include but not limited to: samples, reagents, washing liquids, elution buffer, solvents and so on. Further, the fluids could have any chemical/physical composition known in the art. In a preferred embodiment as shown in FIG. 1, the fluid/fluid mixture is substantially formed of a liquid capable of flowing in the fluid line 130.

Figure 2:
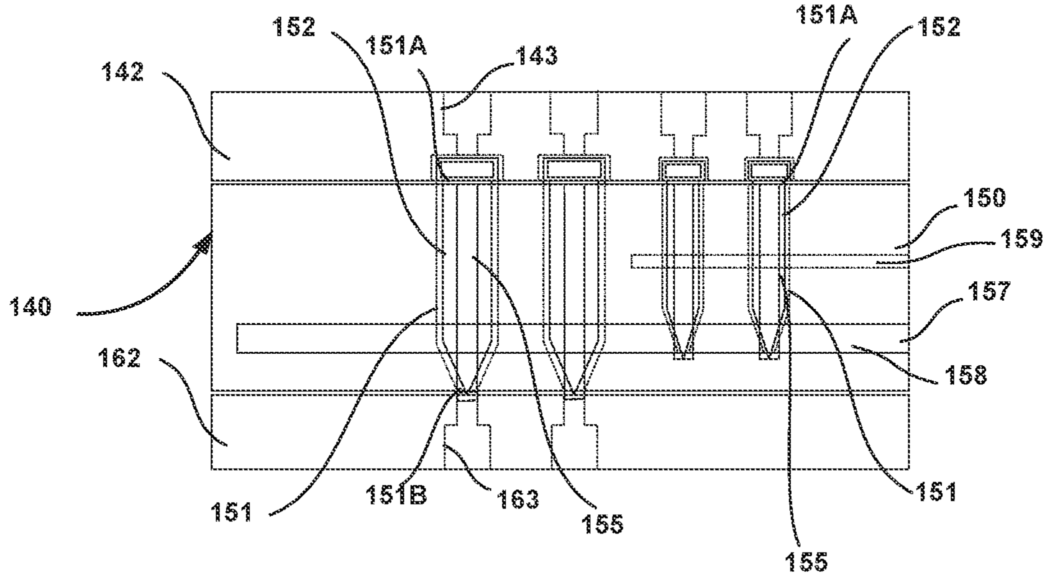
FIG. 2 is a schematic view of a conical vial enclosure of the sequential injection sample analysis apparatus of FIG. 1.

Referring to FIGS. 1-2, the conical vial enclosure 140 comprises a vial top cap 142, a vial bottom cap 162, and a vial block 150 that is positioned between the vial top cap 142 and the vial bottom cap 162. The vial top cap 142 includes a vial top cap port 143 fluidly connected to an outer port 122B of the first multi-position stream selection device 120 through a fluid line 130. The vial bottom cap 162 includes a plurality of vial bottom cap ports 163 fluidly connected to an outer port 122B of the second multi-position stream selection device 120' through another fluid line 130.

Referring to FIGS. 1-4, the vial block 150 comprises a plurality of vial holes 151 wherein each vial hole 151 selected from the plurality of vial holes 151 is configured to receive an enclosed conical vial 152 wherein the top end of the enclosed conical vial 152 is in fluid communication with a corresponding vial top cap port 143 and the bottom end of the enclosed conical vial 152 is in fluid communication with a corresponding vial bottom cap port 163. As seen in FIGS. 1-2, each of the two vial holes 151 positioned on left-hand side has a top opening 151A that corresponds to the open top end of an enclosed conical vial 152 and a bottom opening 151B that corresponds to the open bottom end of an enclosed conical vial 152 as the two enclosed conical vials 152 positioned on the left-hand side is open from the top end as well as from the bottom end. Further as seen in FIGS. 1-2, each of the two vial holes 151 positioned on right-hand side has a top opening 151A only that corresponds to the open top end of an enclosed conical vial 152, and the bottom end of each of the two vial holes 151 positioned on right-hand side is closed as the two enclosed conical vials 152 positioned on the right-hand side is closed from the bottom end. The enclosed conical vial 150 is configured to facilitate mixing of the two or more fluids within the enclosed conical vial 152. In an embodiment, the enclosed conical vial 150 is configured to facilitate mixing of the sample coming from the sample line 132 with the reagent coming from the reagent line 134 within the enclosed conical vial 152. Thus, the enclosed conical vial 152 acts as a mixing chamber for homogeneous mixing of the sample and reagent.

In another embodiment (not shown in figures), each of the vial hole 151 selected from the plurality of vial holes 151 has a top opening 151A that corresponds to the open top end of the enclosed conical vial 152 as well as a bottom opening 151B that corresponds to the open bottom end of the enclosed conical vial 152. Further, it should be obvious that the number of vial holes 151 could further be changed (more or less than four) depending on the overall requirements of the human analyst.

In an embodiment as shown in FIG. 1, the enclosed conical vial 152 is removably placed (housed) in the vial hole 151 of the vial block 150. In another embodiment (not shown in figures), the enclosed conical vial 152 could be integrally formed in the vial block 150.

In an embodiment as shown in FIGS. 1-2, the vial block 150 further comprises a temperature control unit 157 to control the temperature in the vial block 150, wherein the temperature control unit 157 comprises a heating (or cooling) element 158 configured to provide (or remove) heat to the enclosed conical vial 152 and a temperature sensing unit 159 configured to detect the temperature of the enclosed conical vial 152. The heating (or cooling) element could include but is not limited to filament heater, cartridge heater, convection heater, radiation heater, Peltier element, and so on. The temperature sensing unit 159 could include any means to detect temperature of the fluid contents of the enclosed conical vial 152. and the means for temperature measurement could include but not limited to: temperature sensors, thermometers, thermocouples, resistance temperature detectors, and so on. Thus, the temperature control unit 157 allows manipulation of the speed of the chemical reactions that take place between the components of the fluid mixture.

The vial block 150 further comprises a viewing window 155, which is made of a substantially transparent material to allow a human analyst to visually analyze the fluid contents in the enclosed conical vial 152.

Referring back to FIG. 1, the sequential injection sample analysis system 100 further comprises a pair of holding coils 180 that is in fluid connection between the first fluid pumping device 110 and the first multi-position stream-selection device 120; wherein the pair of holding coils 180 includes interior passageways forming a portion of the fluid path in the sequential injection sample analysis system 100; and a third holding coil 180' is in fluid connection between the second fluid pumping device 110' and the second multi-position stream-selection device 120'; wherein the third holding coil 180' includes interior passageways forming a portion of the fluid path in the sequential injection sample analysis system 100. The pair of holding coils 180 and the third holding coil 180' is essentially a capillary tube that is wound around a rigid element to reduce the overall length of the capillary tube and thus, occupy less space. The configuration of the pair of holding coils 180 and the third holding coil 180' preserves the option of fluid mixing by aspirating liquid segments into the capillary tubes of the pair of holding coils 180 and the third holding coil 180' and then subjecting the neighboring liquid segments to "shaking" by flow reversals using the first fluid pumping device 110 and the second fluid pumping device 110', thereby achieving the conventional (basic) function of the traditional sequential injection sample analysis. This configuration of the pair of holding coils 180 and the third holding coil 180' is useful to provide a somewhat non-homogeneous fluid mixture and thus, could be useful in some operations that do not require a complete homogeneous fluid mixture.

In an embodiment, as shown in FIG. 1, the pair of holding coils 180 essentially contains one large-volume coil 180 and one small-volume coil 180. In another embodiment (not shown in figures), the pair of holding coils 180 essentially contains two coils 180 of the same volume. In another embodiment (not shown in figures), the pair of holding coils 180 could be substituted/replaced by a single holding coil 180 that could be selectively positioned/arranged in either one of the two positions of the pair of holding coils 180.

Further, two mixing tee connectors 190A, and 190B are arranged in fluid lines 130. The mixing tee connector 190B allows an enclosed conical vial 152 to be accessed in two different ways. As an example, one branch of the mixing tee connector 190B can have a straight connection to the first fluid pumping device 110. This allows the first fluid pumping device 110 to dose fluids directly to the enclosed conical vial 152, with minimal dead volume between the enclosed conical vial 152 and the first fluid pumping device 110. The other branch of the mixing tee connector 190B is connected to a first multi-position stream selection device 120, so that the first fluid pumping device 110 can aspirate small volumes of fluids through the plurality of outer ports 122B of the first multi-position stream selection device 120 and dispense the fluid into the enclosed conical vial 152. The arrangement of the mixing tee connector 190A provides the option of selecting one of the pair of holding coils 180 and their associated channel ports 113.

A detector 170 is in fluid communication with the at least one of the first multi-position stream selection device 120 and the second multi-position stream selection device 120', for generating a signal indicative of some parameter/property of the mixed fluid and thus, the detector 170 is capable of performing a fluid mixture test. The detector 170 could include but not be limited to: a LED-based photometer and so on. Further, it should be understood that the detector 170 could include any devices and transducers that make physical and/or chemical measurements related to fluid mixture.

In another embodiment (not shown in figures), the sequential injection sample analysis system 100 comprises multiple detectors 170, a plurality of samples and a plurality of reagents, thereby simultaneously performing more than one test.

Figure 3:
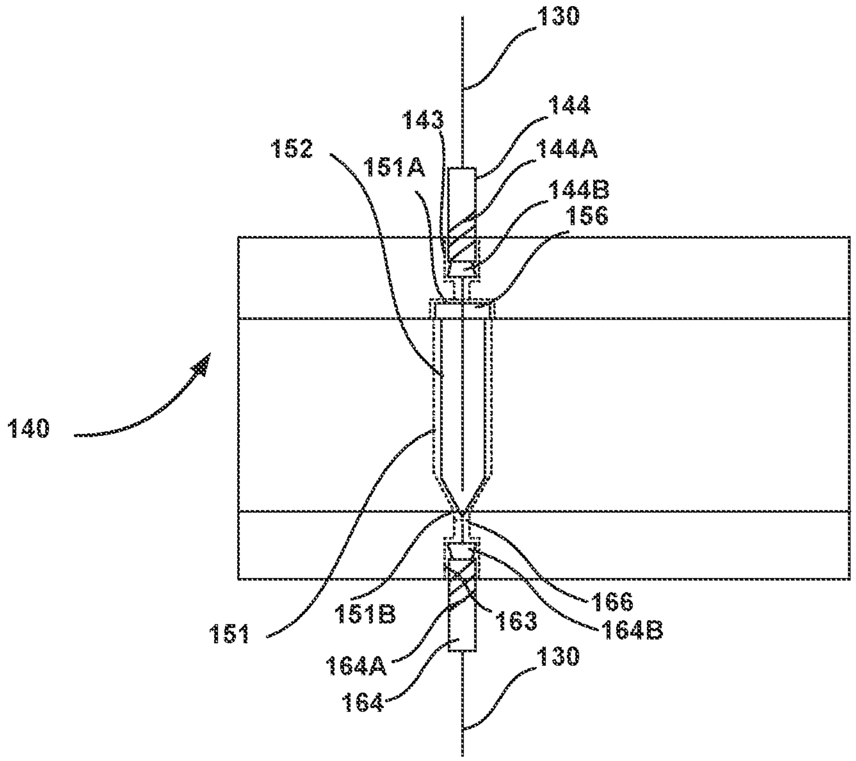
FIG. 3 is a schematic view of a mechanical fluid sealing arrangement of the conical vial enclosure of FIG. 2.
Figure 4:
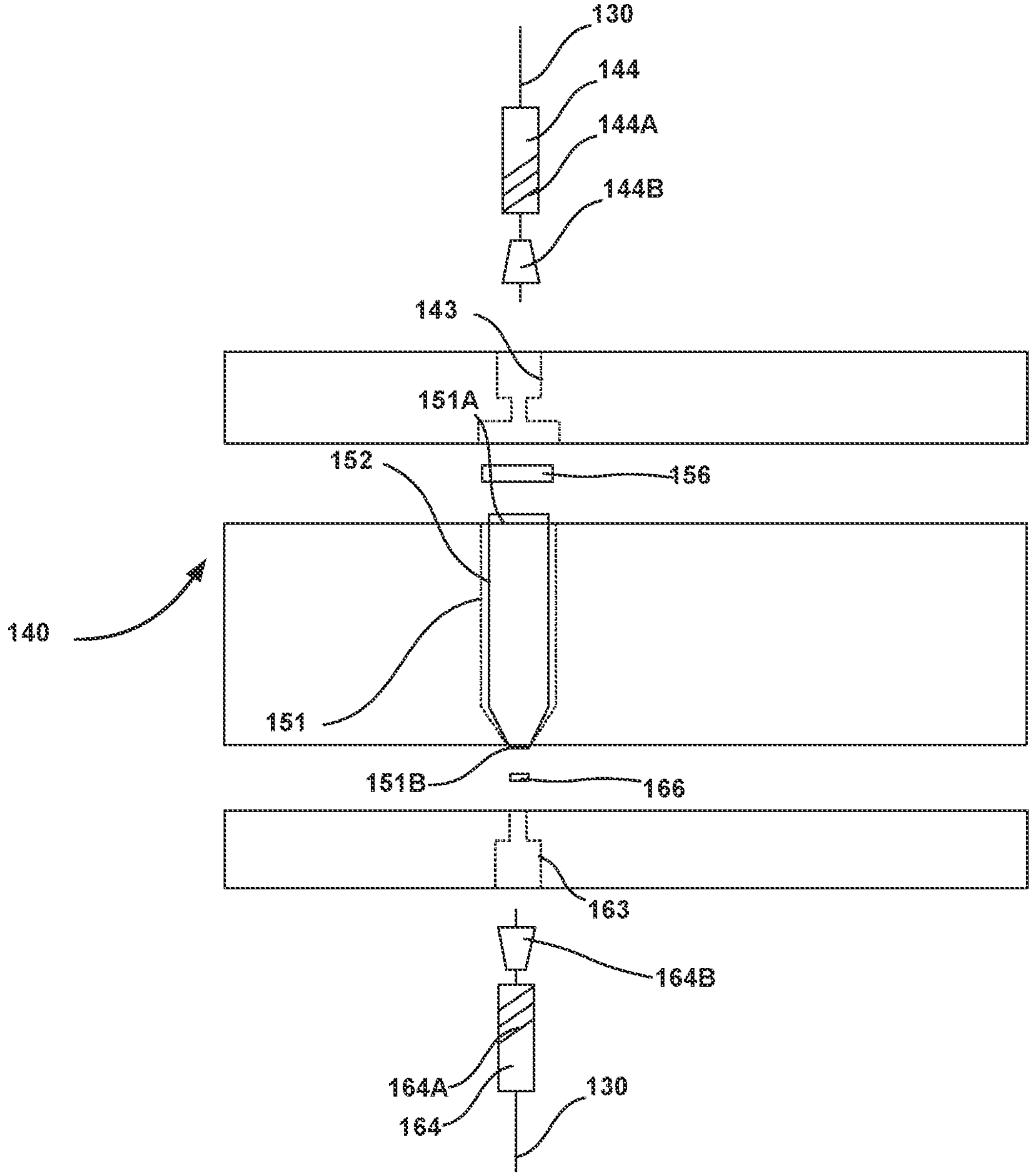
FIG. 4 is an exploded view of the mechanical fluid sealing arrangement of the conical vial enclosure of FIG. 3.

FIG. 3 and FIG. 4 are a schematic view and a exploded view of a mechanical fluid sealing arrangement of the conical vial enclosure 140 respectively. As shown in FIG. 3, the mechanical fluid sealing arrangement of only one vial top cap port 143 of the vial top cap 142, one vial hole 151, one enclosed conical vial 152 and one vial top bottom port 163 of the vial bottom cap 162 is shown for sake of simplicity. The vial top cap 142 further includes a first sealing ring 156 that is positioned between the enclosed conical vial 152 and the vial top cap 142 to sealably connect the enclosed conical vial 152 and the vial top cap 142. Further, the vial top cap 142 comprises a first connector element 144 that sealably connects the vial top cap 142 with the fluid line 130. In an embodiment, the first connector element 144 includes a screw 144A that engages against internal helical threads of the vial top cap port 143; and a ferrule 144B that ensures fluid sealing of the vial top cap port 143 against the fluid line 130.

The vial bottom cap 162 further includes a second sealing ring 166 that is positioned between the enclosed conical vial 152 and the vial bottom cap 162 to sealably connect the enclosed conical vial 152 and the vial bottom cap 162. Further, the vial bottom cap 162 comprises a second connector element 164 that sealably connects the vial bottom cap 162 with the fluid line 130. In an embodiment, the second connector element 164 includes a screw 164A that engages against internal helical threads of the plurality of vial bottom cap ports 163; and a ferrule 164B that ensures sealing of the plurality of vial bottom cap ports 163 against the fluid line 130.

Figure 5:
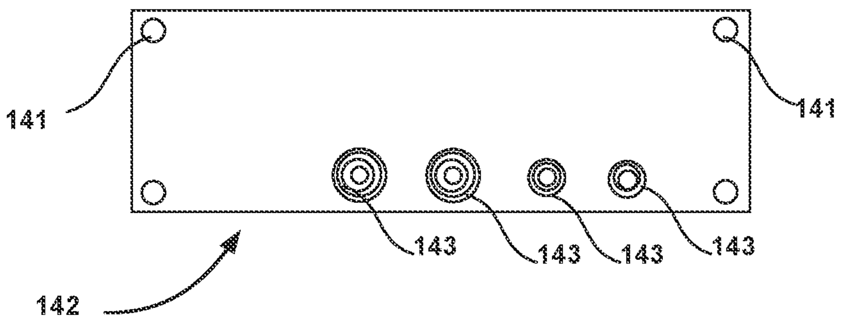
FIG. 5 is a top view of a vial top cap of the conical vial enclosure of FIG. 2, according to an embodiment of the present invention.
Figure 6:
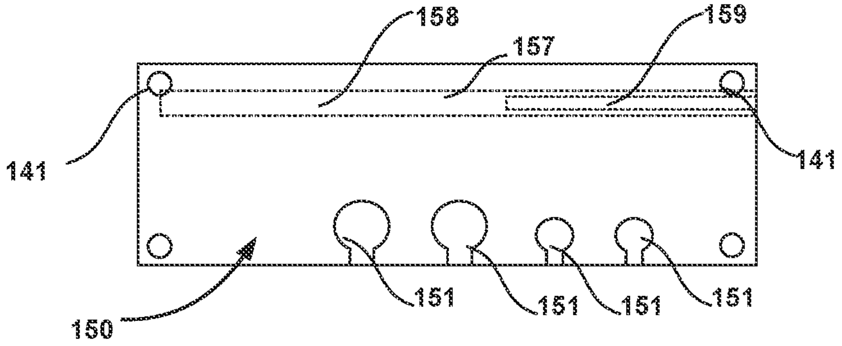
FIG. 6 is a top view of a vial block of the conical vial enclosure of FIG. 2, according to an embodiment of the present invention.

FIG. 5 and FIG. 6 are a top view of a vial top cap 142 and a vial block 150 of the conical vial enclosure 140, respectively, according to an embodiment of the present invention. The vial top cap 142 comprises a plurality of vial top cap ports 143 wherein the diameter of the vial top cap ports 143 of left-hand side is set larger than diameter of the vial top cap ports 143 of right-hand side. The variable diameter (size) of the vial top cap ports 143 ensures that enclosed conical vials 152 of various volumes can be enclosed in the conical vial enclosure 140. Similarly, the vial bottom cap 162 comprises a plurality of vial bottom cap ports 163 wherein the diameter of the plurality of vial bottom cap ports 163 of left-hand side is set larger than diameter of the plurality of vial bottom cap ports 163 of right hand side. It should be understood that the port size of the vial bottom cap 162 follows a similar pattern as that of vial top cap 142 to allow various sized enclosed conical vials 152 of various volumes to be enclosed in the conical vial enclosure 140. Similarly, the vial block 150 comprises a plurality of vial holes 151 wherein the diameter of the vial holes 151 of left-hand side is set larger than diameter of the vial holes 151 of right-hand side. The variable diameter (size) of the plurality of vial holes 151 ensures that enclosed conical vials 152 of various volumes can be enclosed in the conical vial enclosure 140. Further, each of the vial top cap 142, the vial block 150 and the vial bottom cap 162 comprises a plurality of screw hole arrangement 141 to enable removable connection (assembly) of the vial top cap 142, the vial block 150 and the vial bottom cap 162.

In another embodiment (not shown in figures), the diameter of the vial top cap ports 143, the diameter of the plurality of vial bottom cap ports 163, and the diameter of the plurality of vial holes 151 are kept the same (equal) to ensure that the enclosed conical vials 152 of same volume can be enclosed in the conical vial enclosure 140.

Referring back to FIG. 1, a controller (not shown in figures) is operatively connected to the first multi-position stream selection device 120, the second multi-position stream selection device 120', the first fluid pumping device 110 and the second fluid pumping device 110', and constructed and arranged for automatic control of fluid flow between the first multi-position stream selection device 120, the second multi-position stream selection device 120', the first fluid pumping device 110, the second fluid pumping device 110', the sample line 132, and the reagent line 134. The controller (not shown in figures) could be a fully automated software-controlled controller that could be executed (played) on a central processing unit (CPU) of a computer device.

An exemplary method of filling, emptying and washing of the enclosed conical vials 152 will now be described in reference to FIGS. 1-6.

Firstly, the first fluid pumping device 110 is enabled to fill an enclosed conical vial 152 with various fluids to be mixed, through the pair of holding coils 180 that connect the first fluid pumping device 110 to the first multi-position stream selection device 120 and the first multi-position stream selection device 120 to the enclosed conical vial 152.

The first fluid pumping device 110 can aspirate various fluids to be mixed from the plurality of channel ports 113 of the first fluid pumping device 110. Alternatively, the first fluid pumping device 110 pulls the various fluids to be mixed from the plurality of outer ports 122B of the first multi-position stream selection device 120. Pulling various fluids to be mixed from the plurality of outer ports 122B of the first multi-position stream selection device 120 has the advantage that various fluids to be mixed don't break through into the syringe of the first fluid pumping device 110 and thus "contaminate" it. Alternatively, the second fluid pumping device 110' can aspirate the various fluids to be mixed from plurality of channel ports 113 of the second fluid pumping device 110'. Alternatively, the second fluid pumping device 110' pulls the various fluids to be mixed from the plurality of outer ports 122B of the second multi-position stream selection device 120'. Pulling various fluids to be mixed from the plurality of outer ports 122B of the second multi-position stream selection device 120' has the advantage that various fluids to be mixed don't break through into the syringe of the second fluid pumping device 110' and thus "contaminate" it.

Once the various fluids to be mixed have been dosed into the enclosed conical vial 152, the syringe of at least one of the first fluid pumping device 110 and the second fluid pumping device 110' goes through a series of short back-and-forth strokes that pull some fluid out of the enclosed conical vial 152 and push the fluid back in. Each time fluid is pushed in, the fluid hits the conical vial bottom of the enclosed conical vial 152, creating a turbulent flow pattern that mixes the various fluids in an efficient manner, thereby achieving homogeneous mixing of the fluids.

Afterwards, when a homogeneous mixture of fluids has been achieved, the fluid mixture may be left in the vial for incubation if a chemical reaction between the mixed fluid components is desired. If the reaction is sluggish at room temperature, it can be accelerated by programming the temperature control unit 157 of the vial block 150 to an elevated temperature. When the incubation time is up, the fluid mixture is aspirated out of the enclosed conical vial 152 either from the top end of the enclosed conical vial 152 using the first fluid pumping device 110 or the bottom end of the enclosed conical vial 152 by using the second fluid pumping device 110'.

Afterwards, the fluid mixture is then taken to the next step towards the detector 170 in the sample detection process. The detector 170 is configured to perform tests related to some parameter/property of mixed fluids depending upon the application of the sequential injection sample analysis system 100.

Afterwards, the enclosed conical vial 152 is washed. The first fluid pumping device 110 dispenses wash liquid to the enclosed conical vial 152. When the first fluid pumping device 110 is filling for the next stroke of wash liquid, the second fluid pumping device 110' aspirates out the first wash through the bottom end of the enclosed conical vial 152. When the first fluid pumping device 110 delivers the next stroke of wash liquid into the enclosed conical vial 152, the second fluid pumping device 110' can send the first wash liquid to waste through the bottom end of the enclosed conical vial 152. Broadly speaking, one fluid pumping device 110 fills the enclosed conical vial 152 with wash liquid while another fluid pumping device 110 drains the liquid from the enclosed conical vial 152. The ability of the two pumping devices to work "double duty" enables the the wash routine to be performed in an efficient manner.

Figure 7:
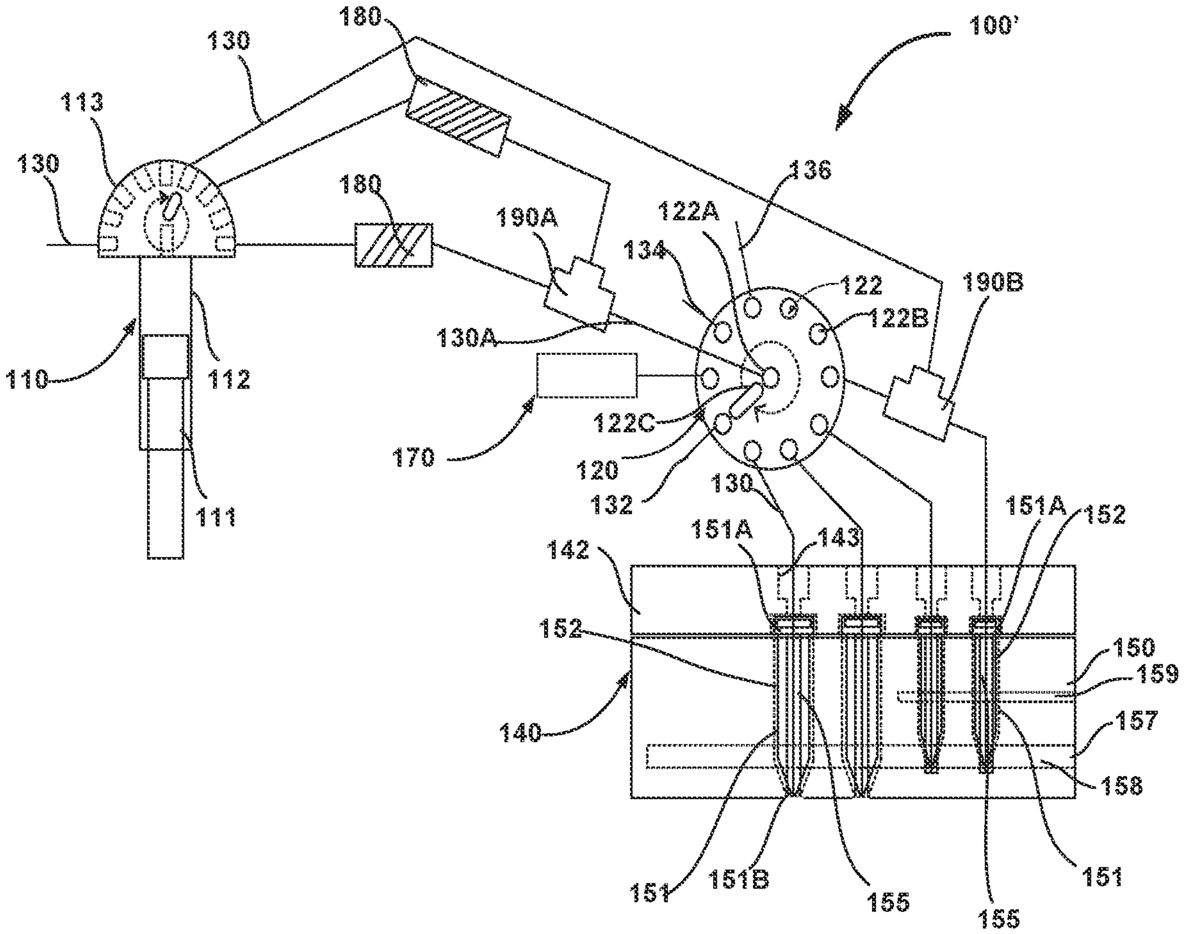
FIG. 7 is a schematic view of a sequential injection sample analysis system in accordance with another embodiment of the present invention.

FIG. 7 is a schematic view of a sequential injection sample analysis system 100' in accordance with another embodiment of the present invention. The sequential injection sample analysis system 100' is similar to the sequential injection sample analysis system 100 shown in FIG. 1, except the omission (removal) of the second fluid pumping device 110', second multi-position stream selection device 120' and the vial bottom cap 162; third holding coil 180' and geometric modifications associated with the enclosed conical vial 152.

Referring now to FIG. 7, the present invention is related to a sequential injection sample analysis system 100', according to a second embodiment of the present invention. The sequential injection sample analysis system 100' comprises a single fluid pumping device 110, a single multi-position stream selection device 120 in fluid communication with a plurality of fluid lines 130, and a conical vial enclosure 140, a controller (not shown in figures) and at least one detector 170, wherein the single fluid pumping device 110, the single first multi-position stream selection device 120 in fluid communication with the plurality of fluid lines 130, the conical vial enclosure 140, the controller (not shown in figures) and the detector 170 are identically same to a first fluid pumping device 110, a first multi-position stream selection device 120 in fluid communication with a plurality of fluid lines 130, a conical vial enclosure 140, a controller (not shown in figures) and at least one detector 170 that are used in the embodiment shown in FIG. 1. However, the sequential injection sample analysis system 100 does not include a second fluid pumping device 110', a second stream selection device 120', the vial bottom cap 162, the third holding coil 180' and fluid lines 130 associated with the second fluid pumping device 110', a second stream selection device 120', the vial bottom cap 162, and the third holding coil 180'.

Again, referring to FIG. 7, the conical vial enclosure 140 comprises a vial top cap 142, and a vial block 150 that is positioned below the vial top cap 142. Further, the enclosed conical vial 152 is open only at the top end and closed at the bottom end for allowing efficient filling of enclosed conical vials 152 from the top end, homogeneous mixing of fluids of enclosed conical vials 152 from the top end in an enclosed environment and emptying the fluid contents of the enclosed conical vials 152 from the top end and washing of the enclosed conical vials 152 from the top end.

Thus, the sequential injection sample analysis system 100' provides a simpler and cost-effective alternative solution for efficient filling, and homogeneous fluid mixing in the enclosed environment.

In another embodiment (not shown in figures), the present invention is related to a sequential injection sample analysis system 100", according to a third embodiment of the present invention. The sequential injection sample analysis system 100" is similar to the sequential injection sample analysis system 100 shown in FIG. 1, except the omission (removal) of the temperature control unit 157 from the conical vial block 150 of the conical vial enclosure 140.

The sequential injection sample analysis system 100" comprises at least one fluid pumping device 110, at least one multi-position stream selection device 120 in fluid communication with a plurality of fluid lines 130, and a conical vial enclosure 140, a controller (not shown in figures) and at least one detector 170, wherein the at least one fluid pumping device 110, the at least one first multi-position stream selection device 120 in fluid communication with the plurality of fluid lines 130, the conical vial enclosure 140, the controller (not shown in figures) and the detector 170 are identically same to a first fluid pumping device 110, a first multi-position stream selection device 120 in fluid communication with a plurality of fluid lines 130, a conical vial enclosure 140, a controller (not shown in figures) and at least one detector 170 that are used in the embodiment shown in FIG. 1. However, the conical vial block 150 of the conical vial enclosure 140 of the sequential injection sample analysis system 100" does not include a temperature control unit 157 to allow manipulation of the speed of the chemical reactions that take place between the components of the fluid mixture.

Thus, the sequential injection sample analysis system 100" provides a more simple and cost-effective alternative solution for efficient filling of enclosed conical vials 152, homogeneous mixing of fluids of enclosed conical vials 152 in an enclosed environment at the room temperature and emptying the fluid contents of the enclosed conical vials 152 and washing of the enclosed conical vial 152.

Further, it should be understood that the sequential injection sample analysis system (100, 100', 100") of the present invention is not limited to any particular size and shape. Further, the it should be understood that the present invention is not limited to any construction material and construction/assembly methods. Broadly speaking, the sequential injection sample analysis system (100, 100', 100") could utilize/employ any construction/assembly methods such as but not limited to welding, screw-joining, riveting and so on; construction material such as but not limited to: metals, plastics and so on; shape such as cuboid, cylindrical and so on; and size known in art.

Finally, while the present invention has been described above with reference to various exemplary embodiments, many changes, combinations, and modifications may be made to the exemplary embodiments without departing from the scope of the present invention. For example, the various components may be implemented in alternative ways. These alternatives can be suitably selected depending upon the particular application or in consideration of any number of factors associated with the operation of the device. In addition, the techniques described herein may be extended or modified for use with other types of devices. These and other changes or modifications are intended to be included within the scope of the present invention.

What is claimed is:

1. A sequential injection sample analysis system (100) comprising:

a first fluid pumping device (110) configured for aspirating and dispensing at least one fluid;

a second fluid pumping device (110') configured for aspirating and dispensing at least one fluid;

a first multi-position stream selection device (120) in fluid communication with the first fluid pumping device (110), wherein the first multi-position stream selection device (120) comprises a plurality of ports (122);

a second multi-position stream selection device (120') in fluid communication with the second fluid pumping device (110'), wherein the second multi-position stream selection device (120') comprises a plurality of ports (122);

a conical vial enclosure (140) comprising a vial top cap (142), a vial bottom cap (162), and a vial block (150) positioned between the vial top cap (142) and the vial bottom cap (162);

wherein the vial top cap (142) includes a plurality of vial top cap ports (143) fluidly connected to the plurality of ports (122) of the first multi-position stream selection device (120);

wherein the vial bottom cap (162) includes a plurality of vial bottom cap ports (163) fluidly connected to the plurality of ports (122) of the second multi-position stream selection device (120');

wherein the vial block (150) comprises a plurality of vial holes (151) and a plurality of enclosed conical vials (152);

wherein each of the plurality of vial holes (151) is configured to receive one of the plurality of enclosed conical vials (152);

wherein each of the plurality of enclosed conical vials (152) is in fluid communication with a corresponding vial top cap port (143) and a corresponding vial bottom cap port (163); and each of the plurality of enclosed conical vials (152) is configured to facilitate the mixing of the at least one fluid received from the first fluid pumping device (110) and the second fluid pumping device (110'); and a plurality of fluid lines (130) configured to transport the plurality of fluids through the sequential injection sample analysis system (100); wherein the plurality of fluid lines (130) are operably connected to the first fluid pumping device (110), the second fluid pumping device (110'), the first multi-position stream selection device (120), the second multi-position stream selection device (120') and the conical vial enclosure (140).

2. The sequential injection sample analysis system (100) according to claim 1, wherein the plurality of fluid lines (130) comprises a sample line (132) that is in fluid communication with one of the plurality of ports (122) of the at least one of the first multi-position stream selection device (120) and the second multi-position stream selection device (120'), wherein the sample line (132) transports a sample;

wherein the plurality of fluid lines (130) further comprises a reagent line (134) that is in fluid communication with one of the plurality of ports (122) of the at least one of the first multi-position stream selection device (120) and the second multi-position stream selection device (120'), wherein the reagent line (134) transports a reagent that is capable of reacting with a component of the sample coming from the sample line (132) to form a reaction product; and wherein the plurality of fluid lines (130) further comprises a solvent line (136) that is in fluid communication with at least one of the first multi-position stream selection device (120) and the second multi-position stream selection device (120'), for dissolving or diluting the reagent coming from the reagent line (134).

3. The sequential injection sample analysis system (100) according to claim 1, wherein the first fluid pumping device (110) and the second fluid pumping device (110') are bi-directional multi-channel syringe pumps.

4. The sequential injection sample analysis system (100) according to claim 1, further comprises a flow detector (170) that is in fluid communication with the at least one of the first multi-position stream selection device (120) and the second multi-position stream selection device (120'), for generating a signal indicative of a parameter property of the mixed fluid.

5. The sequential injection sample analysis system (100) according to claim 1, further comprises a controller operatively connected to the first multi-position stream selection device (120), the second multi-position stream selection device (120'), the first fluid pumping device (110) and the second fluid pumping device (110'), and constructed and arranged for automatic control of fluid flow between the first multi-position stream selection device (120), the second multi-position stream selection device (120'), the first fluid pumping device (110), the second fluid pumping device (110'), the sample line (132), and the reagent line (134).

6. The sequential injection sample analysis system (100) according to claim 1, wherein a pair of holding coils (180) are in fluid connection between the first fluid pumping device (110) and the first multi-position stream-selection device (120); wherein the pair of holding coils (180) includes interior passageways forming a portion of the fluid path in the sequential injection sample analysis system (100); and a third holding coil (180') is in fluid connection between the second fluid pumping device (110') and the second multi-position stream-selection device (120'); wherein the third holding coil (180') includes interior passageways forming a portion of the fluid path in the sequential injection sample analysis system (100).

7. The sequential injection sample analysis system (100) according to claim 1, further comprises a mixing tee connector (190B) arranged in one of the plurality of fluid lines (130).

8. The sequential injection sample analysis system (100) according to claim 1, further comprises:

a first sealing ring (156) positioned between each of the plurality of enclosed conical vials (152) and the vial top cap (142); and a second sealing ring (166) positioned between each of the plurality of enclosed conical vials (152) and the vial bottom cap (162).

9. The sequential injection sample analysis system (100) according to claim 1, wherein the vial block (150) comprises a temperature control unit (157) to control the temperature in the vial block (150), wherein the temperature control unit (157) comprises a heating element (158) configured to provide heat to the plurality of enclosed conical vials (152) and a temperature sensing unit (159) configured to detect the temperature of the plurality of enclosed conical vials (152).

10. The sequential injection sample analysis system (100) according to claim 1, wherein the vial block (150) comprises a viewing window (155) to allow analyst to visually analyse the fluid contents in the plurality of enclosed conical vials (152).

11. A sequential injection sample analysis system (100'), comprising:

a fluid pumping device (110) configured for aspirating and dispensing a plurality of fluids;

a multi-position stream selection device (120) in fluid communication with the fluid pumping device (110), wherein the multi-position stream selection device (120) comprises a plurality of ports (122);

a conical vial enclosure (140) comprising a vial top cap (142), and a vial block (150) positioned below the vial top cap (142);

wherein the vial top cap (142) includes a plurality of vial top cap ports (143) fluidly connected to the plurality of ports (122) of the multi-position stream selection device (120), wherein the vial block (150) comprises a plurality of vial holes (151) and a plurality of enclosed conical vials (152);

wherein each of the plurality of vial holes (151) is configured to receive one of the plurality of enclosed conical vials (152);

wherein each of the plurality of enclosed conical vials (152) is in fluid communication with a corresponding vial top cap port (143); and each of the plurality of enclosed conical vials (152) is configured to facilitate the mixing of the plurality of fluids; and a plurality of fluid lines (130) configured to transport the plurality of fluids through the sequential injection sample analysis system (100'); wherein the plurality of fluid lines (130) are operably connected to the fluid pumping device (110), the multi-position stream selection device (120) and the conical vial enclosure (140).

12. The sequential injection sample analysis system (100') according to claim 11, wherein the plurality of fluid lines (130) comprises a sample line (132) in fluid communication with one of the plurality of ports (122) of the multi-position stream selection device (120), wherein the sample line (132) transports a sample; wherein the plurality of fluid lines (130) further comprises a reagent line (134) that is in fluid communication with one of the plurality of ports (122) of the multi-position stream selection device (120), wherein the reagent line (134) transports a reagent that is capable of reacting with a component of the sample coming from the sample line (132) to form a reaction product; wherein the plurality of fluid lines (130) further comprises a solvent line (136) that is in fluid communication with the multi-position stream selection device (120), for dissolving or diluting the reagent coming from the reagent line (134).

13. The sequential injection sample analysis system (100') according to claim 11, wherein the fluid pumping device (110) is a bi-directional multi-channel syringe pump (110).

14. The sequential injection sample analysis system (100') according to claim 11, further comprises a flow detector (170) that is in fluid communication with the multi-position stream-selection device (120), for generating a signal indicative of a parameter of the mixed fluid.

15. The sequential injection sample analysis system (100') according to claim 11, further comprises a controller operatively connected to the multi-position stream-selection device (120) and the fluid pumping device (110), and the controller is constructed and arranged for automatic control of fluid flow between the multi-position stream-selection device (120), the fluid pumping device (110), the sample line (132), and the reagent line (134).

16. The sequential injection sample analysis system (100') according to claim 11, wherein a pair of holding coils (180) are in fluid connection between the fluid pumping device (110) and the multi-position stream-selection device (120); wherein the pair of holding coils (180) includes interior passageways forming a portion of the fluid path in the sequential injection sample analysis system (100').

17. The sequential injection sample analysis system (100') according to claim 11, further comprises a mixing tee connector (190B) arranged in one of the plurality of fluid lines (130).

18. The sequential injection sample analysis system (100') according to claim 11, further comprises a sealing ring (156) positioned between each of the plurality of enclosed conical vials (152) and the vial top cap (142).

19. The sequential injection sample analysis system (100') according to claim 11, wherein the vial block (150) comprises a temperature control unit (157) to control the temperature in the vial block (150), wherein the temperature control unit (157) comprises a heating element (158) configured to provide heat to the plurality of enclosed conical vials (152) and a temperature sensing unit (159) configured to detect the temperature of the plurality of enclosed conical vials (152).

20. The sequential injection sample analysis system (100') according to claim 11, wherein the vial block (150) comprises a viewing window (155) to allow analyst to visually analyse the fluid contents in the plurality of enclosed conical vials (152).

* * * * *